United States Patent [19]

von Dardel et al.

[11] 4,327,065

[45] Apr. 27, 1982

[54] METHOD OF PREPARING SILICA AEROGEL

[76] Inventors: Guy von Dardel, Gyllenkroks Alle 19, S-222 24 Lund; Sten A. Henning, Herdevägen 2; Leif O. G. Svensson, Dekanvägen 7, both of S-240 10 Dalby, all of Sweden

[21] Appl. No.: 142,812

[22] Filed: Apr. 22, 1980

[30] Foreign Application Priority Data

Apr. 30, 1979 [SE] Sweden .................... 7903766

[51] Int. Cl.$^3$ .......................................... C01B 33/158
[52] U.S. Cl. .................................... 423/338; 126/417
[58] Field of Search .......... 423/336, 338; 136/89 P; 126/417

[56] References Cited

U.S. PATENT DOCUMENTS

| | | | |
|---|---|---|---|
| 2,093,454 | 9/1937 | Kistler | 423/338 X |
| 2,249,767 | 7/1941 | Kistler | 423/338 X |
| 3,268,366 | 8/1966 | Guyot | 136/89 P |
| 3,672,833 | 6/1972 | Teichner et al. | 423/338 |
| 3,681,017 | 8/1972 | Butcher et al. | 423/338 |
| 4,076,651 | 2/1978 | Jaques | 423/338 X |
| 4,173,969 | 11/1979 | Scholl | 126/417 |

Primary Examiner—Jack Cooper
Attorney, Agent, or Firm—Eugene E. Geoffrey, Jr.

[57] ABSTRACT

Silica aerogel in the form of a substantially crack-free, preferably transparent block is described, together with a method for the preparation of such aerogel and use thereof in solar panels. The preparation is effected by means of hydrolysis of a tetraalkoxysilane, preferably tetramethoxysilane, in an alcohol, preferably methanol, in the presence of a catalyst, preferably ammonia, for the formation of an alcogel which is aged for approximately 10 days and washed with alcohol for removing water. The alcogel is thereafter treated in an autoclave by means of a temperature increase to above the critical point of the alcohol, isothermic pressure drop by means of the release of alcohol vapor, and temperature drop. The temperature increase, the pressure drop and the temperature drop take place at the such low mean rates that the aerogel does not crack. To this end, a total treatment time in the autoclave of at least 24 hours is required. After the autoclave treatment, a heat treatment at 500° to 750° C. is possibly carried out for further improving the transparency of the aerogel.

6 Claims, No Drawings

METHOD OF PREPARING SILICA AEROGEL

The present invention relates to a novel form of silica aerogel and, more precisely, silica aerogel in the form of a substantially crack-free and preferably transparent block. The invention also relates to a method of preparing such silica aerogel, as well as for use of the aerogel.

BACKGROUND OF THE INVENTION

It is previously known to manufacture silica aerogel in pulverulent form. However, as far as can be ascertained, it is not known to prepare silica aerogel in the form of large blocks, and, above all, not substantially crack-free such blocks.

By way of the example of the prior art, mention might be made of U.S. Pat. No. 3,672,833 which describes the preparation of silica aerogel by hydrolysis of lower alkyl orthosilicate in an alcohol, and heating the formed silica gel in an autoclave together with further alcohol to a temperature above the critical point of the alcohol. The addition of further alcohol is made in order that the critical pressure be exceeded when the temperature is raised above the critical point. Thereafter, the pressure in the autoclave is reduced in that water and alcohol vapor are released, the autoclave is flushed out with dry inert gas and is reclosed, and is then cooled to room temperature. Those conditions which are utilized according to the U.S. patent specification result in the obtention of the silica aerogel in the form of a granular material which is intended to be used as, for example, gelification or thickening agents.

According to the U.S. patent specification, the hydrolysis of the alkyl orthosilicate may be carried out in acid, neutral or basic media, acid hydrolysis with acetic acid being preferred. In hydrolysis in a basic medium, a colourless and transparent aerogel is obtained.

There is a need in this art to be able to prepare such silica aerogel in a form of large, whole and crack-free blocks, in particular transparent such blocks.

Such silica aerogel has, namely, exceptionally low thermal conductivity with a consequently high level of effectivity as a thermal insulation material, good resistance to high temperatures, high adsorption capacity for gases, and is, moreover, preferably transparent. In particular this latter form which is transparent, that is to say allows the passage of radiation within the visible range of the spectrum, is of particular interest as windows in planar solar panels. A solar panel which is provided with such silica aerogel readily allows the passage of solar radiation into the solar panel but prevents the heat which is thus generated in the solar panel from being dissipated. Furthermore, the transparent material is usable as window insulation, in that a layer of the material is introduced between two window panes in order to improve thermal insulation without appreciably obstructing view through the window.

SUMMING-UP OF THE INVENTION

The above features are realized as a result of the present invention which produces silica aerogel in the form of a substantially crack-free, preferably transparent block.

The present invention has also realized a method of preparing silica aerogel in the form of a substantially crack-free, preferably transparent block, by hydrolysis of a silicic acid ester dissolved in a solvent, to the formation of a silica gel which is converted to silica aerogel by means of treatment in a closed vessel at pressure and temperature conditions above the critical point of the solvent, with a subsequent pressure reduction to atmospheric by allowing the escape of solvent vapor from the vessel and lowering the temperature to ambient temperature. The method according to the invention is characterized in that the reaction temperature, in the hydrolysis, is kept at or below room temperature, that the formed silica gel is aged and washed with fresh solvent in order to remove water, that the treatment in the vessel is carried out for a period of at least 24 hours, and that the silica aerogel is thereafter possibly subjected to a heat treatment at atmospheric pressure.

Finally, the present invention also relates to the use of such silica aerogel in the form of substantially crack-free, transparent blocks in solar panels.

Further characteristics of the present invention will be apparent from the accompanying claims.

When "blocks" are discussed above and in the following description, this is meant to relate to material pieces of a volume of at least 0.1 dm$^3$, preferably at least 1 dm$^3$ which pieces have a substantial thickness in relation to their other dimensions (such as cubes). Thus, the thickness of a block according to the invention normally is at least 1 cm, and preferably from 2 to 3 cm.

Thus, the present invention fills a need in the art and obviates the shortcomings in this respect which are inherent in the prior art and, in particular, U.S. Pat. No. 3,672,833 such that it is possible to obtain, instead of particulate silica aerogel, large, whole blocks of silica aerogel. To this end, the method according to the present invention has, on several vital points, been modified with respect to the method according to the U.S. patent specification, as has been intimated above and as will be described in greater detail below.

The method according to the invention for preparing silica aerogel (hereinafter designated simply aerogel for the sake of simplicity) maybe described as comprising two major steps which are each one divided into a plurality of sub steps. Moreover, an optional third step may follow on the second major step.

The first major step comprises the hydrolysis of a silicic acid ester in an alcohol to the formation of silica gel (hereinafter designated alcogel).

The second major step comprises autoclave treatment of the alcogel for removal of the solvent from the alcogel and the formation of aerogel.

The optional third step consists of a heat treatment of the aerogel.

DETAILED DESCRIPTION OF THE INVENTION

The different steps will be described in greater detail below in the sequence in which they are carried out, the characterizing features of the invention being given particular emphasis.

As has been pointed out earlier, the preferred embodiment of the invention consists of crack-free block-shaped silica aerogel which is substantially transparent. As has also been mentioned earlier in conjunction with the discussion of U.S. Pat. No. 3,672,833, transparent aerogel is obtained in hydrolysis in a basic medium. It will be preferred, therefore, to utilize a basic catalyst, such as sodium hydroxide or ammonia in the hydrolysis. Ammonia is to be particularly preferred. In those cases where transparency in the finished silica aerogel is not a conditional requirement, the hydrolysis may, however, be carried out utilizing other hydrolysis catalysts, such as acetic acid, hydrogen peroxide etc. Since transparent silica aerogel constitutes the preferred embodiment of the invention, the invention will be described below with particular reference thereto, it being understood that the invention is not, therefore, considered as restricted to such silica aerogel.

As a starting material for the first major step, use is made of a silicic acid ester which is dissolved in a solvent and hydrolysed by means of water and a catalyst. The silicic acid ester consists of a tetraalkoxysilane, preferably tetramethoxysilane or tetratoxysilane. Tetramethoxysilane is to be particularly preferred. The solvent should be a solvent for the silicic acid ester which is utilized and should, moreover, be miscible in water and the hydrolysis catalyst which is used. A further criterion is that the critical temperature and pressure of the solvent should not be too high. In view of these points, lower alcohols are preferred, such as those having from 1 to 4 carbon atoms, and primarily methanol and ethanol as solvents. Methanol constitutes, at the present time, the most preferred solvent. It should be pointed out that the amount of solvent will determine the density of the finished aerogel and its refractive index. The added amount of water must be sufficient to enable complete hydrolysis to take place. The stoichiometrically requisite water amount may simply be calculated from the formula of the hydrolysis reaction. In general, the water amount is from 1 to 5 times the stoichiometrically requisite amount, preferably from 2 to 5 times the stoichiometric amount and most preferably from 2 to 3 times the stoichiometric amount. The transparency of the finished aerogel is but slightly dependent upon the water content during the hydrolysis, but, on the other hand, the risk of crack-formation in the aerogel increases at high water content. Apart from the fact that the hydrolysis catalyst in the invention should, naturally, catalyze the hydrolysis reaction, it should preferably be volatile and should not, furthermore, in the preferred embodiment of the invention, have an injurious effect on the transparency of the finished aerogel. For this reason, as was mentioned above, a basic catalyst was selected by preference, ammonia being particularly preferred, since it leaves no traces in the finished aerogel and is easy to obtain and handle. In this context, it has also been possible to ascertain that an increased content of catalyst entails an increased transparency in the aerogel. At the same time however, an increased catalyst amount gives rise to a powerful increase in temperature. Normally, according to the present invention a catalyst amount of approximately 100–1500 ppm is selected, preferably approximately 1000 ppm, calculated on the total mixture.

A characteristic feature of the invention is that the hydrolysis reaction is carried out with cooling of the components, either before or during the reaction proper. The reason for this is that the alcogel is very sensitive to thermal shock, which entails that the temperature at the end of the reaction must lie at about room temperature in order to minimize the thermal gradients in the alcogel. In order to eliminate the heat which is developed in the exothermic hydrolysis reaction, it is possible either to cool the mixture during the reaction or to start the reaction with very cold liquids. The present invention calls for selection of the latter course of action, the process being executed as follows.

Two solutions are prepared, of which one contains the tetraalkoxysilane at approximately room temperature and the other contains the solvent (e.g. methanol) and water at approximately $-10°$ C. Immediately prior to the mixing of the two liquids, the catalyst (e.g. ammonia) is added to the second solution. After the solutions are brought together, they are agitated vigorously, an emulsion being first formed, since the alkoxysilane and the water are not soluble in each other. After approximately 10 minutes, a transparent colloidal dispersion is obtained. The agitation is continued for a further few minutes, whereupon the mixture is poured into moulds to gel.

When the mixture has gelled in the moulds and formed alcogel, two sub steps, specific to the invention, are carried out; namely aging and washing of the alcogel.

The silicic acid formed in the hydrolysis reaction is dehydrated and polymerized, water being given off. In this manner a number of small kernels are formed, whose interior is constituted by amorphous silicon dioxide and whose outer surface displays silanol groups. In due course the kernels are coupled by siloxane linkages to form a space net. However, in the formation of the alcogel, not all of the kernels have been coupled to each other and it is for this reason that the formed alcogel is allowed to age according to the invention. As a result of the aging process, a more complete polymerization will be achieved, which results in better mechanical properties in the alcogel and, thereby, in the finished aerogel. According to the invention, the alcogel is aged for from 2 to 20 days, preferably about 10 days.

Washing of the alcogel is effected for removing water after the hydrolysis reaction. The reason for that is that this water disturbs the formation of the above-mentioned space net and entails a risk for crack-formation in the aerogel. Furthermore, an increased degree of transparency in the aerogel will be obtained if the water is washed out. This washing process is effected in that the alcogel is placed in successive baths of solvent. As solvent from the different baths, it is possible, in this context, either to utilize the same solvent, or solvents which are anhydrous to different degrees, the solvent in the final bath being the most highly anhydrous and, consequently, having the greatest water absorption capacity. If the solvent consists of methanol, the washing may be effected such that the alcogel is first washed in a methanol bath of 96% methanol. After two days, the bath will have absorbed so much water that the methanol content will have fallen to 92%. The second bath consists of pure 100% methanol and the alcogel is kept in this bath for eight days, after which time the methanol-content will have fallen to 96% because of water absorption. In an original water content in the alcogel of 13,6%, this washing process resulted in a final water content of approximately 4% which is a satisfactory value. Further washing-out of the water may, naturally, take place, but this is of less practical value and is time-consuming from the point of view of production. For improving the transparency, a total washing time of approximately ten days is optimum and twenty days is maximum. A further increase of the washing time would give no further improvement of the transparency in the aerogel, and the improvement in the transparency which is obtained after ten days washing is relatively inconsiderable.

In order that an aerogel be obtained from the alcogel, the solvent must be removed from the alcogel. The simplest method of removing the solvent may seem to be quite simply to heat the alcogel until such time as the solvent evaporates. However, this method would not result in whole blocks of aerogel, but merely powder, since the above-mentioned space net would collapse. The transition from liquid phase to vapor phase for the solvent must, instead, take place at the same time for all of the alcogel in order to avoid such a collapse. This is realized in that, as was mentioned above, the solvent is caused to pass its critical point, that is to say the point of critical temperature and pressure, and the solvent vapor is thereafter removed by isothermic expansion.

The treatment of the alcogel for coversion to aerogel constitutes the second major step and is carried out, in practice, in an autoclave. The process may be divided up into several sub steps, such as: heating step, equilibrium step, isothermic pressure reduction step and cooling step.

For carrying out the heating step, the alcogel is placed in the autoclave together with a sufficient amount of solvent (e.g. methanol) for reaching the critical point. The heating step according to the invention is characterized in that it is carried out with a very slow temperature elevation. This is one condition in order that whole blocks of aerogel may be obtained. As an upper limit for the temperature elevation, the present invention calls for 25° C./h, but it is preferred to raise the temperature at a rate of only about from 10° to 15° C./h. In the temperature elevation, a simultaneous pressure increase corresponding to the vapor pressure curve of the solvent will take place in the autoclave. For methanol as solvent with a critical temperature of 240° C. and a critical pressure of 78,5 bar, a temperature elevation rate of from 11 to 13° C./h has been found to be suitable for a commencement temperature of approximately 15° C. and a final temperature of 275° C. These values entail that the heating step takes approximately from 20 to 24 hours. These values may also be used as norm values for a number of other solvents with similar values for critical pressure and temperature. As examples, mention might be made of the critical temperature/critical pressure for the following solvents: ethanol 243° C./63 bar; propanol 264° C./50,9 bar; iso-butanol 263° C./41,4 bar; acetone 236° C./47 bar (cf. water 374° C./218 bar).

When the critical point, that is the point of the critical temperature and pressure for the solvent in a pressure/-temperature diagram has been reached and passed, the temperature elevation is discontinued and an equilibrium step is commenced. This step is intended to stabilize the parameters of temperature and pressure, which takes place in approximately 0.5 hours.

When the temperature and pressure have finally been brought into equilibrium, the solvent is removed in that it is, under isothermic conditions, released from the autoclave with a consequential gradual pressure drop in the autoclave down to ambient atmospheric. Direct or instantaneous pressure drop can not take place, since this would result in such stresses in the alcogel/aerogel in the autoclave that the gel would break up into small pieces. The pressure drop must instead take place gradually at a substantially constant pressure gradient in order to ensure that aerogel in the form of whole blocks is obtained. The maximum pressure drop rate according to the invention is approximately 10 bar/h, which, from a highest pressure of approximately 90 bar, as is used with the solvent methanol, entails that the pressure drop takes 9 hours. Normally however, a slower pressure drop is to be preferred in order to preserve the aerogel as far as is possible, and a suitable time for the pressure drop is from 11–16 hours, which gives a pressure drop rate of 5.6 to 8 bar/h. The pressure drop takes place, as far as is possible, isothermically, that is to say at constant temperature, in order to ensure that all of the solvent departs from the autoclave as vapor.

In conjunction with the pressure drop and before the cooling step, the autoclave is evacuated, for example, by means of water suction, in order to remove the final vapors of the solvent. The pressure in the autoclave is then kept at a few cm Hg for a period of about 10 to 15 minutes.

The cooling step is then commenced in that air is introduced carefully into the autoclave while the evacuation is in progress. The pressure in the autoclave on the introduction of air is adjusted at approximately 30–50 cm Hg, and this pressure is maintained during the cooling step. A lower pressure would entail so-called thermos effect, whereby the cooling would be delayed or hindered. By maintaining the pressure at the disclosed value, the air in the autoclave is under constant replacement, vapors from the solvent accompanying the outgoing air. The evacuation is not discontinued until the cooling down process is completed, air being then allowed in to the autoclave up to atmospheric pressure.

Concerning the actual temperature drop during the cooling step, this is effected from the attained, supercritical maximum temperature to ambient or room temperature. It is also important that this temperature drop takes place at slow rate, in particular in the initial phase, in order that the aerogel does not crack and fall to pieces. According to the invention, a maximum mean rate for the temperature drop is about 75° C./h, which, for a temperature drop of approximately 300° C. gives a time of 4 hours. Preferably, the temperature is lowered slightly more slowly, at a rate of about 50° C./h, which for a temperature drop of 300° C., gives a time of 6 hours, and for a temperature drop of 250° C., gives a time of 5 hours. The disclosed temperature drop rates relate to mean rates, it being important, as was intimated above, that at least the initial temperature drop phase takes place slowly. Thus, the initial temperature drop may take place in that the autoclave, with its contents, is allowed to cool substantially by itself, whereupon cooling with increased air circulation is initiated after a few hours in order to shorten the time necessary for the temperature drop. Naturally, the entire temperature drop may take place by natural cooling, but from the point of view of production this is not to be preferred, since it takes too long a time.

When the temperature drop is completed, the finished aerogel according to the invention may be removed in the form of a substantially crack-free, transparent block. In this context it should be noted that when mention is, here, made of "substantially crack-free", this is taken to mean that of the silica aerogel blocks which are prepared according to the invention, the major part display no cracks. It is almost impossible completely to avoid crack-formation, but in the present invention we have succeeded in keeping the crack-formation frequency at as little as 12%.

The finished aerogel from the autoclave may be used as it is, but in those cases when it is considered desirable, a final heat treatment of the aerogel may be carried out in order further to improve its transparency. The reason for this is that chemical analysis has revealed that the aerogel, after the above-described autoclave treatment, still contains minor amounts of carbon and hydrogen which probably derive from the alcohol solvent, which adheres as a mono layer to the silicon dioxide particles in the aerogel space net. For removing this remaining solvent residue, the aerogel is heated to a temperature of approximately 500° C. to 750° C. in an oxygen-containing atmosphere in order to oxidize the alcohol residue to aldehyde/acid and remove it. Heating and cooling in this heat treatment are effected at a mean rate of at most about 75° C./h, preferably about 35° C./h, and the attained temperature is kept constant for 0.5-5 h during the heat treatment. The simplest process is to carry out the heat treatment in air, but the heat treatment may also be carried out in oxygen gas which gives a more effective oxidation. The heat treatment improves the transparency of the aerogel by about 10 to 15%. If the heat treatment is carried out at a temperature above about 750° C. sintering of the aerogel occurs, which entails higher density and refractive index.

As was mentioned above, the finished aerogel according to the invention is distinguished by its extremely high thermal insulation capacity. The material has a coefficient of thermal conductivity, $\lambda$ of about 0.02 W/m°C., which is on a par with the best known thermal insulators. This corresponds to a k-value of 0.4 W/m$^2$°C. for 5 cm thick aerogel, which is to be compared with a k-value of approximately 2 W/m$^2$°C. for a modern triple glass window. It is even possible, with the material according to the invention, to realize a lower thermal conductivity than in stationary air ($\lambda$ for stationary air=0.026 W/m°C.), which is otherwise generally considered as constituting the limit to that which may be attained by thermal insulation material. That this limit value does not apply to block-formed aerogel according to the invention is because the pores in the aerogel are so extraordinarily small (approximately 100 Å) and much smaller than the free average length of the air molecules, whereby the conditions would rather be analogous to a vacuum than to stationary air.

Because of this very high thermal insulation capacity, the material is of interest as a thermal insulator in fields of application where space is restricted, for example in aeroplanes and boats. For such fields of application it is also of great value that the material, which may be said to consist of quartz when seen from the chemical point of view, is completely incombustible and withstands high temperatures of at least up to 750° C. while retaining shape and thermal insulation capacity.

In fields of application where solely the thermal insulation capacity of the aerogel is of importance and no particular emphasis is placed on transparency, the silica aerogel according to the invention may be opaque or coloured. This type of material is obtained in that, as was mentioned above, the hydrolysis is carried out using an acid catalyst or by the addition of various colourants.

For increasing the mechanical strength of the aerogel according to the invention, it may be reinforced, for example with glass fibre.

Apart from its very low thermal conductivity, the preferred, transparent block-like aerogel according to the invention has that property, unique vis-a-vis all prior art thermal insulators, of being transparent for visible light, and displays an extremely low refractive index of 1.01-1.06. In greater thicknesses, the material has a bluish hue because of the light scattering towards the submicroscopic pores. This Rayleigh-scattering increases with fading wavelength and is, therefore, particularly manifest in the blue region of the spectrum. For green light, the bisection length for the light scattering may be made as long as 10 cm so that, in those thicknesses which may occur in practice, the optical transparence is very good (80–90%).

Furthermore, since the silica aerogel according to the invention is porous and has open pores, the aerogel will in due time be filled with the gas in which it is located. One adsorption on the walls of the pores, relatively large gas volumes may be adsorbed because of the great total surface area. By an addition of a heavy gas, the air in the pores of the aerogel may be replaced by the heavy gas, whereby the thermal insulating capacity of the aerogel is further improved.

The invention has been described above in great detail and the particular features which characterize the invention and distinguish it from the prior art have been pointed out. The values and ranges which have been disclosed for different parameters are based on practical experiments.

In order further to exemplify the invention, the preparation of aerogel in the manner which is, at the present time, to be most preferred, will be described.

The starting point is 6 parts by volume of tetramethoxysilane and a solution consisting of 2 parts by volume of methanol and 3 parts by volume of water. The amount of water corresponds to twice the stoichoimetric amount which is required for complete hydrolysis of the tetramethoxysilane. The solution of methanol and water was cooled to $-10°$ C. and 1000 ppm ammonia was added (trade product containing 25% by volume ammonia), calculated on the total volume of the silane, methanol and water. The two liquids were poured into a mould whose dimensions were 20 cm×20 cm×3 cm and were carefully mixed for forming the alcogel. The inner surfaces of the mould were coated with a layer of polytetrafluoroethylene (PTFE) in order to preclude adhesion or sticking of the silica gel to the mould. Such sticking would be detrimental, since shrinkage of the silica gel during processing would cause the gel to crack.

The formed alcogel in the mould was covered with methanol in order to avoid stresses in the alcogel as a result of methanol evaporation from the alcogel proper. Thereafter, the alcogel was aged and washed in the above-described manner by being placed, for two days, in a bath of 96% methanol, and thereafter for eight days in a bath of 100% methanol. The water content of the alcogel was thereafter approximately 4%. The mould with the alcogel and sufficient methanol to attain the critical point, was thereafter placed in an autoclave having a volume of 98 liters and at an ambient temperature of approximately 15° C. After closing of the autoclave, the above-described pressure-temperature treatment was carried out for removing the methanol solvent and for forming the aerogel. The temperature elevation was carried out for a time of approximately 24 hours to a temperature of approximately 275° C., that is to say with a temperature elevation rate of approximately 11° C./h. During this process, the pressure increased to 90 bar. Once maximum pressure and temperature had been achieved, these were subjected to an equilibrium process for a period of 0.5 hours. Thereafter, a valve on the autoclave was opened for releasing methanol vapor, the pressure in the autoclave falling to atmospheric in 16 hours. This entails a pressure drop rate of 5.6 bar/h. Evacuation was carried out as described above. Hereafter, the temperature was lowered in 5 hours, which, at a maximum temperature of 275° C. and an ambient temperature of 15° C., gives a temperature drop rate of 52° C./h. The mould with the finished aerogel was thereafter removed from the autoclave and subjected to heat treatment in air at 500° C. for 4 hours. The rate for the temperature elevation and temperature drop in the heat treatment was 35° C./h. As a result of the heat treatment, the transparency of the aerogel was improved by 13%.

The thus obtained aerogel had a refractve index of 1.05 and a density of approximately 0.24 g/cm$^3$. The block, which was crack-free, was almost perfectly transparent, apart from a faint bluish hue. The coefficient of thermal conductivity $\lambda$ for the aerogel was 0.021 W/m°C., which indicates a very good thermal insulating capacity. This also gives an intimation of an important field of use for the aerogel according to the invention, namely as light-permeable impingement surfaces in solar panels. As a result of its unique properties, the aerogel according to the invention will allow the passage of solar light into the solar panel, but will not release the heat generated by the solar light, which as a result may be used to greater advantage. Another field of the application for the aerogel according to the invention is as thermally insulating intermediate layers in multipane glass units. Since the aerogel is substantially transparent, it may exercise its thermal insulation function in a window without appreciably disturbing the transparency of the window.

The description which has been presented above of particularly preferred embodiments of the invention is merely intended to illustrate the invention and not to restrict it. The general scope of the present invention is determined by the following claims.

We claim:

1. A method of preparing silica aerogel in the form of a moulded substantially crack-free block comprising the steps of hydrolyzing a silicic acid ester dissolved in an alcohol with water added thereto, in a mould adapted to the desired dimensions, to form a silica alcogel, said hydrolysis being carried out at or below room temperature, washing and aging the alcogel for a period of 2 to 20 days, said washing being performed with an alcohol to remove water from said alcogel, then converting said alcogel to an aerogel by placing it in a closed pressure vessel with alcohol in an amount to at least reach the critical temperature and pressure thereof, subjecting the alcogel-alcohol mixture to a treatment consisting of heating the mixture above the critical point of the alcohol at a mean rate not exceeding 25° C./hr., releasing the alcohol vapor from said vessel to reduce the pressure isothermally at a mean rate not exceeding 10 bars/hr. to atmospheric pressure and then lowering the temperature in said vessel at a mean rate not exceeding 75° C./hr. to ambient temperature, wherein the duration of the treatment in said pressure vessel is at least 24 hours.

2. Method according to claim 1, wherein the duration of the treatment in said pressure vessel is carried out for approximately 48 hours.

3. Method according to claim 1, wherein the temperature increase in said pressure vessel takes place at a mean rate of approximately 11° C./h, the pressure reduction takes place at a mean rate of approximately 6 bar/h, and the temperature reduction takes place at a mean rate of approximately 50° C./h.

4. Method according to claim 1, wherein the silica aerogel is, subsequent to the treatment in said pressure vessel, subjected to a heat treatment at a temperature of approximately 500° to 750° C.

5. A method according to claim 4 wherein said heat treatment is carried out in an oxygen containing atmosphere.

6. A method of preparing silica aerogel according to claim 1 wherein said alcohol and water used for hydrolyzing said silicic acid ester includes a catalyst.

* * * * *